July 4, 1939.  G. L. SMITH  2,165,076
CLEARANCE ADJUSTER FOR BRAKES
Filed Dec. 22, 1937
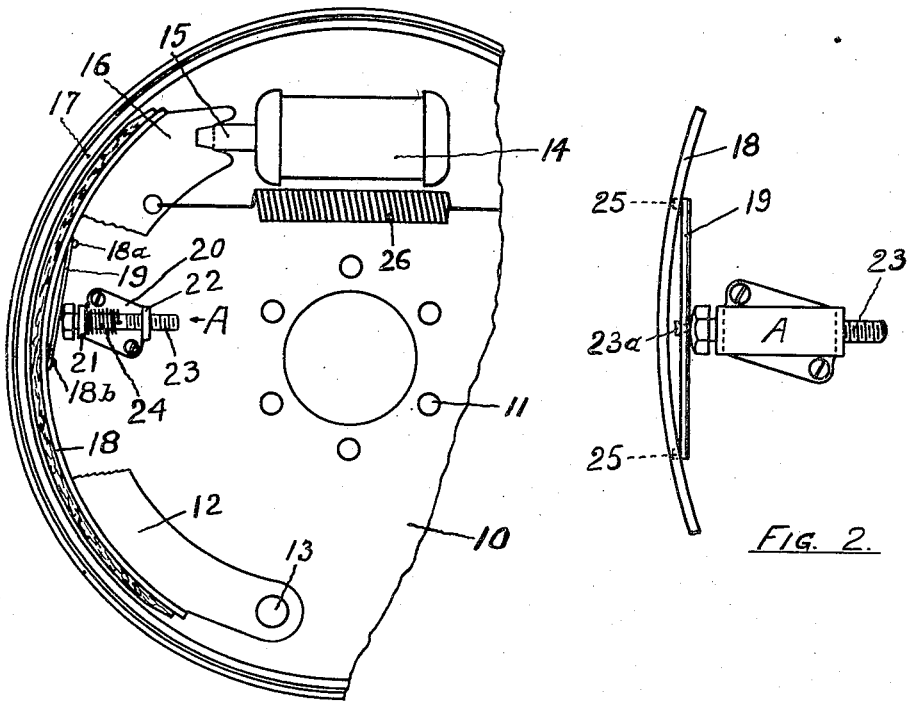
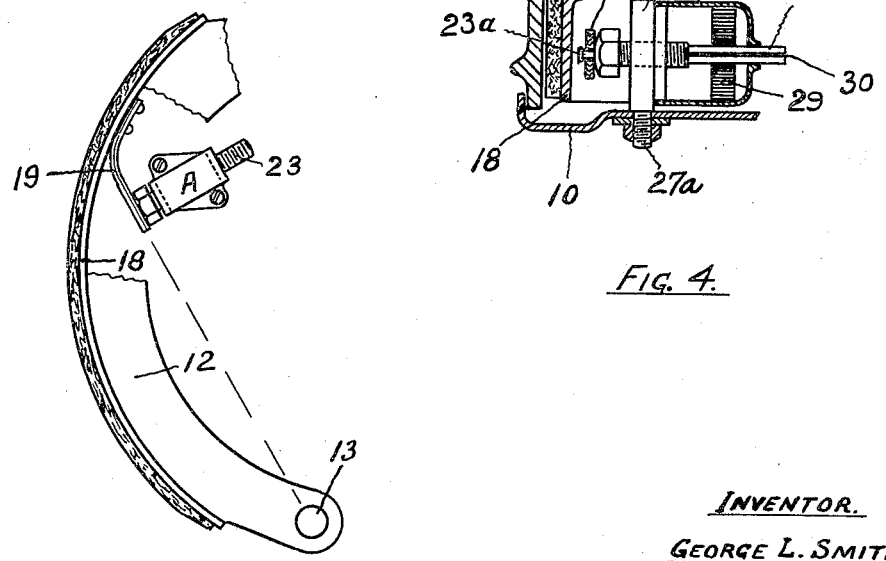
INVENTOR.
GEORGE L. SMITH
BY
ATTORNEY.

Patented July 4, 1939

2,165,076

UNITED STATES PATENT OFFICE 2,165,076

CLEARANCE ADJUSTER FOR BRAKES

George L. Smith, Washington, D. C., assignor to Thermo Brakes Corporation, Washington, D. C., a corporation of Virginia Application December 22, 1937, Serial No. 181,243

10 Claims. (Cl. 188—79.5)

My invention relates to brakes for motor vehicles and especially to the adjustment thereof. Up to the present time vehicle brakes have been so constructed that periodical adjustment for wear of the brake lining is required. Consequently the danger always exists that some individuals may forget to have this adjustment made promptly and as a result, the brakes may fail to stop the vehicle in time to prevent an accident.

To overcome this danger, I provide a slack or clearance adjuster which automatically follows up the brake applying movement from time to time as the brake lining wears down, and this adjuster includes means which not only controls the normal running clearance, but also the running clearance when brakes are hot, and in such a way that no overadjustment will take place to cause a dragging brake when parts have cooled off. More specifically, this means consists of a bar of bi-metal normally straight, or approximately so, which increases its curvature as it heats up. This bar also acts as a leaf spring in resisting the releasing movement of the brake, and as a stop in limiting the automatic action of the adjuster proper; while the bending action of this bar caused by heat maintains the running clearance of the brake practically constant whether the brake drum is hot or cold.

In the drawing chosen to illustrate my invention, wherein like characters of reference denote corresponding parts in the different views:

Fig. 1 is a fragmental side elevation of an hydraulically operated brake with my adjuster applied thereto;

Fig. 2 is a modified construction of the adjuster in which no part thereof is carried by the brake shoes;

Fig. 3 is a modified form of adjuster in which one part is rigidly carried by the shoe;

Fig. 4 is a sectional view of still another modification of the adjuster.

Referring to the drawing the numeral 10 represents the backing plate of the brake which is mounted on the axle of a vehicle by means of bolts or rivets in the holes 11, all as is well known to those skilled in the art. A brake shoe 12 is shown pivoted to the plate 10 by the anchor pin 13. The hydraulic cylinder 14 is also attached to the plate 10 and has a piston operating the piston rod 15 which pushes against the toe 16 of shoe 12 thus swinging it about anchor pin 13 into contact with the brake drum 17.

On the inside of the flange 18 of the shoe 12 I secure loosely by studs or rivets 18a and 18b so that it will be free to bend, the bi-metal strip 19 with the high expansion side toward the centre of the brake. On the plate 10 I secure my automatic follow up adjuster A. It consists of a bracket 20 mounted on the backing plate 10 and having flanges 21 and 22 turned up to carry a bolt 23. This bolt is threaded into the inner flange 22 and is free to slide in flange 21. This bolt carries a torsion spring 24 which always tends to unscrew the bolt from the bracket thus forcing the head of the bolt against the bi-metal strip 19. As the spring is a small one, it does not cause the bolt 23 to bend the bi-metal strip 19 to any appreciable extent.

In Fig. 2 I show a bi-metal strip 19 which is carried loosely on a pin 23a extending from the end of the bolt 23. The two ends of this strip have ears 25, 25, which hook under the flange 18 and keep the strip from turning on the pin 23a. This construction does not require any parts to be carried by the brake shoe thus avoiding any possibility of complicating the operation of relining the brakes.

In Fig. 3 I show the bi-metal strip securely riveted to the brake shoe at one end and having its free end bearing upon the head of bolt 23. This construction shows the free end of the strip lined up with anchor bolt 13 and the adjuster set practically perpendicular to the line of swinging movement of the shoe at the point of contact between adjuster and strip 19 so that there would be practically no sliding movement between adjuster bolt and bi-metal strip.

In Fig. 4 I show a modified construction of adjuster comprising a mounting 27 having a threaded shank 27a for securing it in a hole in backing plate 10. The adjuster bolt 23 is threaded into the mounting 27 and carries the bi-metal strip 19 on the stud 23a. A barrel 28 containing a clock spring 29 is secured to the mounting 27 and the bolt 23 has a slotted end 30 to receive the inner end of the spring 29. The outer end of this spring is secured to the barrel 28.

The mechanism operates as follows:

In Fig. 1 when the brake is applied by the action of the brake cylinder 14 and piston rod 15, the spring 24 will cause the bolt 23 to screw out as necessary to maintain contact of the bolt head with the strip 19 and hold this strip pressed lightly against the shoe 12. After contact of the shoe with the drum and in case of long and hard use of the brake, the drum 17 will heat up and expand causing the shoe 12 to swing further out about its pin 13 and this further movement of the shoe would allow the bolt to be screwed out a corresponding amount in following it up but this does not take place because the strip 19 heats up also and bends toward the bolt head to prevent this movement. While this bending action lags somewhat behind the expanding action of the drum, still it takes place in sufficient time to prevent the running clearance of the brake being taken up to any great extent, thereby preventing a dragging brake when parts have cooled off.

When the brake is released after an application the release spring 26 rotates the shoe 12 clockwise and causes considerable pressure to be exerted on the bolt head by the strip 19. This pressure bends the strip and this bending provides the proper running clearance. Any desired amount of clearance is obtained by selecting the proper length and stiffness for the strip 19. The strip 19, being flexible, will bend in proportion to the stresses applied to it. The spring 24 is a comparatively weak one, as previously stated, and in screwing the bolt 23 out into contact with the strip it has very little effect in bending it, but the release spring 26 is a very strong one and its bending action on the strip 19 is sufficient to pull the shoe away from its drum an appreciable distance and thus maintain ample running clearance for the brake.

While I have shown the strip 19 in Figure 1 as straight it will be readily understood by those skilled in the art that said strip is slightly flexed in the released status of the brake. However, as this flexing would not be over .010 of an inch the actual showing of this small distance would be invisible and quite impossible to incorporate. It is to be so assumed.

From the above it is apparent that the device A acts in one way only, to follow up the wear of the brake lining and that the bi-metal strip controls the running clearance of the brake whether drum is hot or cold so that this clearance will be substantially constant. With drum expanded due to heat the shoe is set out toward it by the bending of strip 19 and as the drum cools off and contracts, the strip 19 cools and straightens out to permit the shoe to be rotated away from the drum by the pull of spring 26.

In the modifications shown in Figures 2, 3 and 4, the same action takes place. In Fig. 2 the bi-metal strip is carried by the bolt head, while in Fig. 3 it is carried by the shoe. In this Fig. 3 the strip acts as a beam secured at one end and loaded at the other, whereas Fig. 2 shows the strip as a beam supported at the two ends and loaded in the middle. Figure 4 shows a clock spring in lieu of one made of steel wire but the action of the mechanism is the same as for the others. In all the views the bi-metal strip is set to bend towards the head of the adjuster bolt 23.

I claim:

1. In a brake mechanism, a braking member having a brake applying movement, a follow up device constantly tending to follow up said movement, and thermostatic means between said member and said device to arrest said follow up movement.

2. In a brake mechanism, a braking member having a brake applying movement and a release movement, a follow up device constantly tending to follow up said applying movement, and resilient means between said member and said device yielding under the action of said release movement.

3. In a brake mechanism, a braking member having a brake applying movement, a follow up device constantly tending to follow up said movement, and thermostatic means carried by said braking member and contacting said device to arrest said follow up movement.

4. In a brake mechanism, a braking member having a brake applying movement, a follow up device constantly tending to follow up said movement, and thermostatic means carried by said device and contacting said braking member to arrest said follow up movement.

5. In a brake mechanism, a braking member having a brake applying movement, a follow up device constantly tending to follow up said movement, and resilient means carried by said member and contacting said device to arrest said follow up movement.

6. In a brake mechanism, a braking member having a brake applying movement, a follow up device constantly tending to follow up said movement, and resilient means carried by said device and contacting said member to arrest said follow up movement.

7. In a brake clearance adjuster a bracket, a member carried by said bracket and having a screw thread connection therewith, a torsion spring connecting said bracket and said member and exerting an unscrewing force on the latter, a brake shoe, and thermostatic means carried by said member and contacting said shoe.

8. In a brake clearance adjuster a bracket, a member carried by said bracket and having a screw thread connection therewith, a torsion spring connecting said bracket and said member and exerting an unscrewing force on the latter, a brake shoe, and resilient means carried by said member and contacting said shoe.

9. In a brake clearance adjuster, a brake shoe, a release mechanism for said shoe, a stop, and a spring positioned between said shoe and said stop and subjected to a bending strain under the action of said release mechanism.

10. In a brake clearance adjuster, a brake shoe, release mechanism for said shoe, a stop and a thermo-sensitive spring positioned between said shoe and said stop and subjected to a bending strain under the action of said release mechanism.

GEORGE L. SMITH.